(12) United States Patent
Hattori et al.

(10) Patent No.: US 8,846,791 B2
(45) Date of Patent: Sep. 30, 2014

(54) TIRE RUBBER COMPOSITION AND PNEUMATIC TIRE

(75) Inventors: Takayuki Hattori, Kobe (JP); Ai Matsuura, Kobe (JP); Michio Hirayama, Kobe (JP); Kenichi Uesaka, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 321 days.

(21) Appl. No.: 12/962,686

(22) Filed: Dec. 8, 2010

(65) Prior Publication Data

US 2011/0136961 A1 Jun. 9, 2011

(30) Foreign Application Priority Data

Dec. 9, 2009 (JP) ................... 2009-279493
Feb. 15, 2010 (JP) ................... 2010-030499

(51) Int. Cl.
| | |
|---|---|
| B60C 1/00 | (2006.01) |
| C08K 5/548 | (2006.01) |
| C08L 15/00 | (2006.01) |
| C08L 7/00 | (2006.01) |
| C08K 3/36 | (2006.01) |
| C08L 83/04 | (2006.01) |
| C08C 19/06 | (2006.01) |

(52) U.S. Cl.
CPC .............. B60C 1/0025 (2013.04); C08L 83/04 (2013.01); C08C 19/06 (2013.01); Y02T 10/862 (2013.01); C08K 5/548 (2013.01); C08L 15/00 (2013.01); C08L 7/00 (2013.01); B60C 1/0016 (2013.04); C08K 3/36 (2013.01)
USPC ............ 524/262; 524/492; 524/493; 524/506

(58) Field of Classification Search
CPC ........ B60C 1/0025; C08K 3/36; C08K 5/548; C08L 7/00; C08L 15/00
USPC ................... 524/262, 492, 493, 506; 528/30; 556/429
See application file for complete search history.

(56) References Cited

U.S. PATENT DOCUMENTS

| | | | | |
|---|---|---|---|---|
| 6,211,278 | B1 * | 4/2001 | Vanel | 524/492 |
| 2004/0266937 | A1 * | 12/2004 | Yagi et al. | 524/493 |
| 2007/0037915 | A1 | 2/2007 | Masumoto | |
| 2007/0197813 | A1 * | 8/2007 | Chaves et al. | 556/427 |
| 2009/0005481 | A1 * | 1/2009 | Ishida et al. | 524/301 |
| 2010/0163150 | A1 | 7/2010 | Hirayama et al. | |

FOREIGN PATENT DOCUMENTS

| | | |
|---|---|---|
| EP | 1 577 341 A1 | 9/2005 |
| EP | 2 105 462 A1 | 9/2009 |
| JP | 2003-64222 A | 3/2003 |
| JP | 2006-47070 A | 2/2006 |
| JP | 2006-70093 A | 3/2006 |
| JP | 2007-56205 A | 3/2007 |
| JP | 2007-70451 A | 3/2007 |
| JP | 2007-269876 A | 10/2007 |
| JP | 2008-56802 A | 3/2008 |
| JP | 2008231417 A * | 10/2008 |
| JP | 2009-24078 A | 2/2009 |
| WO | WO 2008/149588 A1 | 12/2008 |

OTHER PUBLICATIONS

Machine translation of JP 2008-231417 A, Oct. 2, 2008.*
Machine translation of JP-2003-64222-A dated Mar. 5, 2003.
Machine translation of JP-2006-70093-A dated Mar. 16, 2006.
Machine translation of JP-2007-56205-A dated Mar. 8, 2007.
Database WPI, Week 200735, AN 2007-367245, JP 2007 070451 A, Mar. 22, 2007, XP-002630211.

* cited by examiner

*Primary Examiner* — Vickey Nerangis
(74) *Attorney, Agent, or Firm* — Birch, Stewart, Kolasch & Birch, LLP

(57) ABSTRACT

It is an object of the present invention to provide a tire rubber composition excellent in performances such as silica dispersibility and processability. The present invention relates to a tire rubber composition, comprising: a rubber component that contains an epoxidized natural rubber; silica; and a silane coupling agent, wherein the amount of the epoxidized natural rubber in 100% by mass of the rubber component is 15% by mass or more, the silica has a CTAB specific surface area of 180 $m^2$/g or more and a BET specific surface area of 185 $m^2$/g or more, and the silane coupling agent contains a mercapto group.

12 Claims, 1 Drawing Sheet

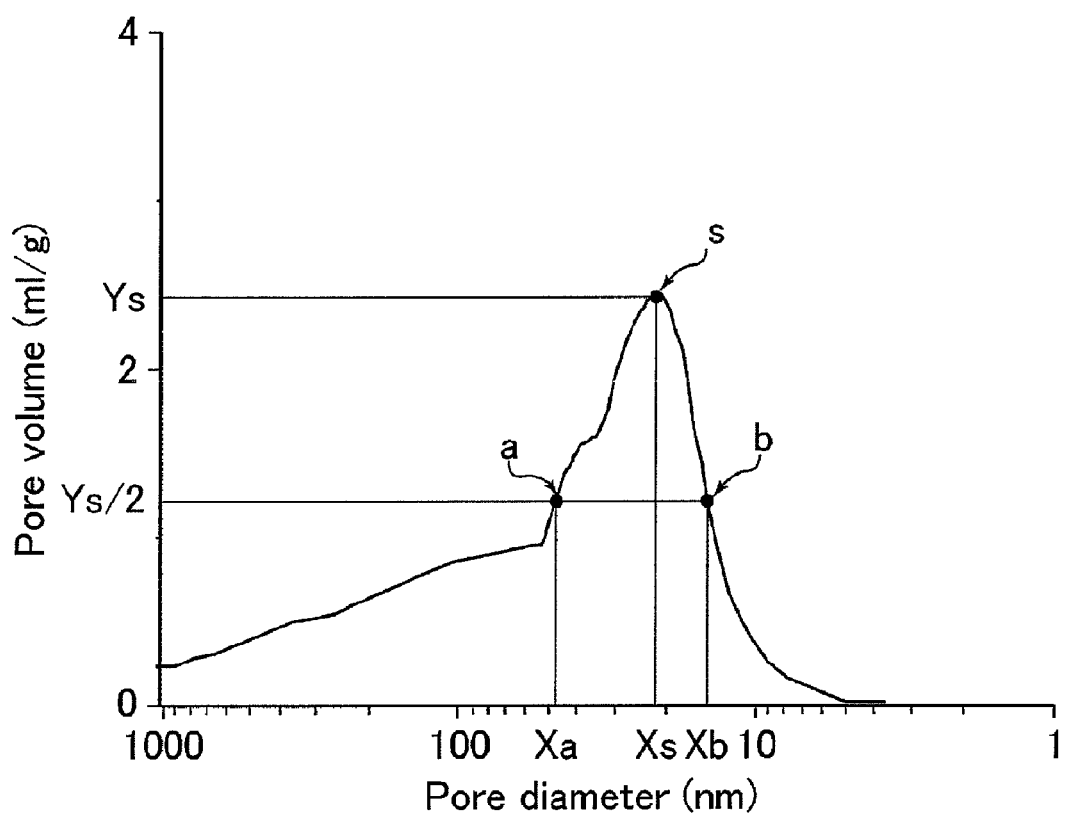

US 8,846,791 B2

TIRE RUBBER COMPOSITION AND PNEUMATIC TIRE

TECHNICAL FIELD

The present invention relates to a tire rubber composition and a pneumatic tire produced using the rubber composition.

BACKGROUND ART

In recent years, rubber compositions for tire treads containing rubber such as natural rubber as a main component have been proposed in consideration of exhaustion of petroleum resources, reduction in rolling resistance, the environment, and the like (see, for example, Patent Document 1). However, for example, the rubber composition for a (cap) tread with natural rubber (NR) used as a main rubber component is problematically inferior in wet grip performance to a conventional rubber composition for a tread with styrene butadiene rubber (SBR) or the like rubbers. For this reason, epoxidized natural rubber (ENR) has been used for a tire tread in order to improve wet grip performance, and thus the exhaustion of petroleum resources and reduction in $CO_2$ emission have been positively addressed.

Thus, the use of the ENR provides a rubber composition for a (cap) tread with good wet grip performance. However, if the rubber composition is used particularly for high performance (very low-profile) tires, and tires for heavy load vehicles among passenger vehicles, the rubber composition is required to be further improved in abrasion resistance, compared with the conventional rubber composition for a tread containing SBR.

In a rubber composition for a (cap) tread, silica has been used as a reinforcing filler because the fuel economy is compatible with the wet grip performance. However, it is very difficult to favorably disperse silica, especially finely-divided silica, in a rubber component containing a predetermined amount or more of ENR. A silane coupling agent is usually used in the silica-containing rubber composition in terms of silica dispersibility and the like. A mercapto group-containing silane coupling agent is highly reactive and has high performance but has a very short scorch time. Thus, it is very difficult to practically use the mercapto group-containing silane coupling agent in the tire industry.

Meanwhile, rubber compositions containing carbon black, as a reinforcing filler, with a rubber component that is obtained by blending NR which shows excellent tensile strength and tear strength, butadiene rubber (BR) which improves flex crack growth resistance, and the like rubbers have been conventionally used for sidewalls and base treads of tires. However, similarly to the rubber composition for a tread, the fuel economy of the rubber composition for a sidewall or a base tread is recently required.

For this reason, a large proportion of or otherwise all of the carbon black is considered to be replaced with a white filler such as silica. However, the replacement with a white filler often causes reduction in dispersibility compared with the carbon black. Thus, breaking energy (tensile strength×elongation at break) is less likely to be sufficiently secured, and therefore crack resistance and flex crack growth resistance problematically decrease. In consideration of exhaustion of petroleum resources and tightening of $CO_2$ emission regulation, it's not just that the carbon black is replaced; synthetic rubbers such as BR are desirably replaced with rubbers derived from non-petroleum resources such as ENR so as to increase the percentage usage of non-petroleum resources in a tire.

For meeting these demands, Patent Documents 2 and 3 disclose rubber compositions for a sidewall which contain silica with NR and ENR so as to increase the content of non-petroleum resources, and have good flex crack growth resistance and tear strength. However, the crack resistance, flex crack growth resistance, and the like performances of the rubber compositions are still required to be improved particularly in case of use for high-performance tires.

Patent Document 1: JP 2003-64222 A
Patent Document 2: JP 2006-70093 A
Patent Document 3: JP 2007-56205 A

SUMMARY OF THE INVENTION

It is an object of the present invention to provide a tire rubber composition excellent in performances such as silica dispersibility and processability so as to solve the above problems. More specifically, the present invention aims to provide: a rubber composition for a tread, in which good rolling resistance is highly compatible with abrasion resistance and which excels in wet grip performance and dry grip performance; and a rubber composition for a sidewall or a base tread which improves rolling resistance, crack resistance, and flex crack growth resistance in good balance. It is also an object of the present invention to provide a pneumatic tire produced using the rubber composition.

The present inventors have found that in a rubber composition containing epoxidized natural rubber and silica which tends to cause problems in abrasion resistance, crack resistance, flex crack growth resistance, and silica dispersibility, combined use of silica having a predetermined value or more of a CTAB specific surface area and a predetermined value or more of a BET specific surface area and a mercapto group-containing silane coupling agent provides good dispersibility of the finely-divided silica and good scorch resistance together, leading to completion of the present invention.

The present invention relates to a tire rubber composition, comprising: a rubber component that contains an epoxidized natural rubber; silica; and a silane coupling agent, wherein the amount of the epoxidized natural rubber in 100% by mass of the rubber component is 15% by mass or more, the silica has a CTAB specific surface area of 180 m²/g or more and a BET specific surface area of 185 m²/g or more, and the silane coupling agent contains a mercapto group.

The silica desirably has an aggregate size of 30 nm or more.

The silane coupling agent is desirably a copolymer comprising units A represented by formula (1) and units B represented by formula (2), in which the proportion of the units B is 1 to 70 mol % of the total molar amount of the units A and the units B.

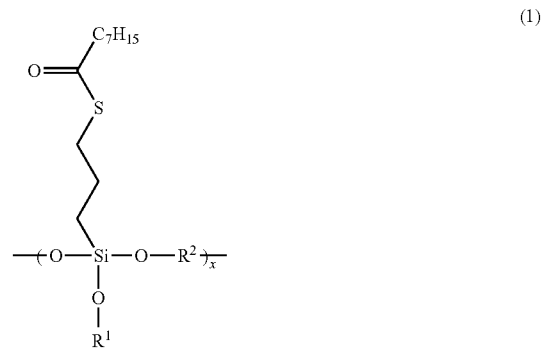

-continued

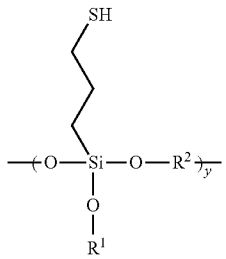

(2)

wherein x and y each are an integer of one or more, $R^1$ represents hydrogen, halogen, a branched or unbranched $C_{1-30}$ alkyl or alkylene group, a branched or unbranched $C_{2-30}$ alkenyl or alkenylene group, a branched or unbranched $C_{2-30}$ alkynyl or alkynylene group, or a group in which a hydrogen atom at the end of the alkyl or alkenyl group is replaced with a hydroxy or carboxyl group, $R^2$ represents hydrogen, a branched or unbranched $C_{1-30}$ alkylene or alkyl group, a branched or unbranched $C_{2-30}$ alkenylene or alkenyl group, or a branched or unbranched $C_{2-30}$ alkynylene or alkynyl group, and $R^1$ and $R^2$ may form a ring structure together.

The rubber composition is desirably used for a tread, a sidewall, or a base tread.

The present invention also relates to a pneumatic tire produced using the rubber composition.

The tire rubber composition according to the present invention comprises a predetermined amount of an epoxidized natural rubber, silica having a predetermined value or more of a CTAB specific surface area and a predetermined value or more of a BET specific surface area, and a mercapto group-containing silane coupling agent. Accordingly, the rubber composition excels in performances such as silica dispersibility and processability. Thus, if the rubber composition is used for a (cap) tread, rolling resistance and abrasion resistance are highly compatible, and excellent wet grip performance and dry grip performance are achieved. If the rubber composition is used for a sidewall or a base tread, rolling resistance, crack resistance, and flex crack growth resistance are improved in good balance. In addition, if the rubber composition is used for a clinch, rolling resistance is highly compatible with abrasion resistance. Accordingly, if the rubber composition is used for each tire component, it is possible to provide a pneumatic tire in which these performances are achieved in good balance. The rubber composition is also excellent in processability (especially kneading processability) upon tire production.

BRIEF DESCRIPTION OF THE DRAWINGS

FIG. 1 is a view illustrating a pore distribution curve.

BEST MODE FOR CARRYING OUT THE INVENTION

The tire rubber composition of the present invention comprises a predetermined amount of an epoxidized natural rubber (ENR), silica having a predetermined value or more of a CTAB specific surface area and a predetermined value or more of a BET specific surface area, and a mercapto group-containing silane coupling agent. Since the rubber composition contains both such silica and silane coupling agent with the ENR, the silica is favorably dispersed. Accordingly, low rolling resistance is compatible with good mechanical strength (crack resistance, flex crack growth resistance, and the like performances), and abrasion resistance. In addition, excellent wet grip performance and dry grip performance are achieved. The combined use of the silica and the silane coupling agent enables maintenance of an appropriate scorch time and improvement in scorch resistance. Accordingly, rubber scorch is prevented, and the processability upon tire production is favorable. Further, since low rolling resistance is compatible with mechanical strength and abrasion resistance, the rubber composition is desirable in consideration of the environment.

The rubber composition of the present invention contains ENR. The use of the ENR in the rubber composition provides good wet grip performance for a (cap) tread, good crack resistance and flex crack growth resistance for a sidewall and base tread, and excellent performances such as air permeation resistance for an inner liner, while considering exhaustion of petroleum resources, reduction in rolling resistance, and the environment. As the ENR, commercially available ENR may be used or the ENR may be prepared by epoxidizing NR. The method for epoxidizing NR is not particularly limited, and examples thereof include a chlorohydrin method, a direct oxidation method, a hydrogen peroxide method, an alkyl hydroperoxide method, and a peracid method (see JP H04-26617 B, JP H02-110182 A, UK Patent GB2113692, etc.). Examples of the peracid method include a method of causing a reaction between NR and an organic peracid such as peracetic acid or performic acid.

The epoxidation degree of the ENR is desirably 3 mol % or more, more desirably 5 mol % or more, further desirably 10 mol % or more, and most desirably 15 mol % or more. If the epoxidation degree of the ENR is less than 3 mol %, it is difficult to sufficiently improve the above-mentioned necessary performances such as wet grip performance. The epoxidation degree of the ENR is desirably 80 mol % or less, more desirably 60 mol % or less, and further desirably 40 mol % or less. If the epoxidation degree of the ENR exceeds 80 mol %, polymers tend to gel.

The epoxidation degree means the proportion of the number of the double bonds between carbons which are epoxidized to the total number of the double bonds in the natural rubber before epoxidation. The epoxidation degree is determined, for example, by titrimetric analysis, nuclear magnetic resonance (NMR) analysis, or the like analysis.

Examples of the NR to be epoxidized include ones generally used in the rubber industry, such as RSS#3 and TSR 20, and latexes before production thereof. Examples of the ENR include ENR25 and ENR50 (each produced by MRB (in Malaysia)). These ENR may be used alone, or two or more kinds thereof may be used in combination.

In the rubber composition of the present invention, the amount of the ENR in 100% by mass of the rubber component is 15% by mass or more. If the amount is less than 15% by mass, it is difficult to improve the wet grip performance of the rubber composition for a (cap) tread, to improve the crack resistance and flex crack growth resistance of the rubber composition for a sidewall or a base tread, and to improve the performances such as air permeation resistance of the rubber composition for an inner liner. The upper limit of the amount of the ENR is not particularly limited, and may be 100% by mass.

Particularly in the case where the rubber composition is used for a tread, the amount of the ENR in 100% by mass of the rubber component is 15% by mass or more, desirably 25% by mass or more, more desirably 30% by mass or more, further desirably 35% by mass or more, particularly desirably 60% by mass or more, and most desirably 85% by mass or more. The upper limit of the amount of the ENR in 100% by mass of the rubber component is not particularly limited, and may be 100% by mass, 95% by mass or less, or 90% by mass or less.

In the case where the rubber composition is used for a sidewall and a base tread, the amount of the ENR in 100% by mass of the rubber component is 15% by mass or more, desirably 20% by mass or more, more desirably 25% by mass or more, further desirably 30% by mass or more, and particularly desirably 35% by mass or more. The amount of the ENR in 100% by mass of the rubber component is desirably 85% by mass or less, more desirably 60% by mass or less, further desirably 50% by mass or less, and particularly desirably 45% by mass or less. If the amount exceeds 85% by mass, rolling resistance tends to be high, and the ENR is less likely to form a sea-island structure with other rubbers such as natural rubber, which may actually result in deterioration in flex crack growth resistance.

In the present invention, the rubber component may contain BR. Thereby, good abrasion resistance and crack resistance are achieved. In addition, rolling resistance can be further improved. If the rubber composition with the BR is used particularly for treads and sidewalls particularly in high performance (very low-profile) tires, and tires for heavy load vehicles among passenger vehicles, more favorable abrasion resistance and crack resistance are exhibited.

The BR desirably has a cis content of 80% by mass or more. Such BR enables better abrasion resistance when used for a tread. The cis content is more desirably 85% by mass or more, further desirably 90% by mass or more, and most desirably 95% by mass or more.

Further, the BR desirably has a viscosity of 80 cps or more in the form of a 5% solution in toluene at 25° C. A viscosity of 80 cps or more greatly improves processability and abrasion resistance. The viscosity of the BR solution in toluene is desirably 200 cps or less. If the viscosity exceeds 200 cps, the viscosity may be excessively high and deteriorate processability, and the BR is less likely to be mixed with other rubbers. The lower limit of the viscosity of the BR solution in toluene is more desirably 110 cps, and the upper limit thereof is more desirably 150 cps.

BR having a molecular weight distribution (Mw/Mn) of 3.0 or less may be used in order to improve abrasion resistance. In addition, BR having an Mw/Mn of 3.0 to 3.4 may be used in order to simultaneously improve both processability and abrasion resistance.

In the case where the rubber composition of the present invention contains the BR, the amount of the BR in 100% by mass of the rubber component is desirably 5% by mass or more, more desirably 10% by mass or more, and further desirably 15% by mass or more. If the amount is less than 5% by mass, it is difficult to provide sufficient effects of the BR mentioned above. The amount of the BR in 100% by mass of the rubber component is desirably 85% by mass or less, more desirably 65% by mass or less, and further desirably 40% by mass or less. If the amount exceeds 85% by mass, processability may be deteriorated. In addition, the relative proportion of the ENR is small, and wet grip performance, air permeation resistance and the like performances are less likely to be improved.

The BR is desirably synthesized from a biomass-derived material in order to reduce environmental load. Such BR may be produced, for example, by a method including reacting a catalyst with bioethanol to produce butadiene and synthesizing BR from the butadiene as a raw material. Although such BR synthesized from a biomass-derived material may be blended as a part of the BR component, the BR component in the rubber composition particularly desirably contains 100% by mass of biomass-derived BR. The biomass-derived material means a "renewable organic resource of biological origin except fossil resources". Whether the material is biomass-derived may be checked by the method of determining the amount of $^{14}C$ (ASTM-D6866).

The rubber composition of the present invention may contain NR as a rubber component, and desirably contains NR particularly when used for a sidewall and a base tread. Examples of the NR include ones generally used in the rubber industry, such as RSS#3 and TSR20 mentioned above.

Particularly in the case where the rubber composition is used for a sidewall and a base tread, the amount of the NR in 100% by mass of the rubber component is desirably 15% by mass or more, more desirably 40% by mass or more, further desirably 50% by mass or more, and particularly desirably 55% by mass or more. If the amount is less than 15% by mass, the NR is less likely to form a sea-island structure with the ENR, which may result in deterioration in flex crack growth resistance. In addition, mechanical strength may be deteriorated. The amount of the NR in 100% by mass of the rubber component is desirably 85% by mass or less, more desirably 75% by mass or less, further desirably 70% by mass or less, and particularly desirably 65% by mass or less. If the amount of the NR exceeds 85% by mass, the amount of the ENR is excessively small, and the NR is less likely to form a sea-island structure with the ENR, which may result in deterioration in flex crack growth resistance.

In addition to the ENR, BR, and NR, the rubber component may contain isoprene rubber (IR), styrene butadiene rubber (SBR), styrene-isoprene-butadiene rubber (SIBR), ethylene-propylene-diene rubber (EPDM), chloroprene rubber (CR), acrylonitrile butadiene rubber (NBR), and the like rubbers.

The rubber composition of the present invention contains silica having a CTAB specific surface area of 180 $m^2/g$ or more and a BET specific surface area of 185 $m^2/g$ or more (hereinafter, also referred to as "finely-divided silica"). If such finely-divided silica is favorably dispersed in rubber, excellent mechanical strength (crack resistance, flex crack growth resistance, and the like performances), excellent dynamic strength (breaking energy), abrasion resistance, wet grip performance, and dry grip performance are achieved, and rolling resistance is reduced.

The CTAB (cetyltrimethylammonium bromide) specific surface area of the finely-divided silica is desirably 190 $m^2/g$ or more, more desirably 195 $m^2/g$ or more, and further desirably 197 $m^2/g$ or more. If the CTAB specific surface area is less than 180 $m^2/g$, mechanical strength and abrasion resistance may not be sufficiently improved. The CTAB specific surface area is desirably 600 $m^2/g$ or less, more desirably 300 $m^2/g$ or less, and further desirably 250 $m^2/g$ or less. If the CTAB specific surface area exceeds 600 $m^2/g$, the silica may agglomerate due to the inferior dispersibility, and therefore physical properties tend to be deteriorated.

The CTAB specific surface area is measured in conformity with ASTM D3765-92.

The BET specific surface area of the finely-divided silica is desirably 190 $m^2/g$ or more, more desirably 195 $m^2/g$ or more, and further desirably 210 $m^2/g$ or more. If the BET specific surface area is less than 185 $m^2/g$, mechanical strength and abrasion resistance may not be sufficiently improved.

The BET specific surface area is desirably 600 $m^2/g$ or less, more desirably 300 $m^2/g$ or less, and further desirably 260 $m^2/g$ or less. If the BET specific surface area exceeds 600 $m^2/g$, the silica may agglomerate due to the inferior dispersibility, and therefore physical properties tend to be deteriorated.

The BET specific surface area of the silica is measured in conformity with ASTM D3037-81.

The aggregate size of the finely-divided silica is 30 nm or more, desirably 35 nm or more, more desirably 40 nm or more, further desirably 45 nm or more, particularly desirably 50 nm or more, more particularly desirably 55 nm or more, and most desirably 60 nm or more. The aggregate size thereof is desirably 100 nm or less, more desirably 80 nm or less, further desirably 70 nm or less, and particularly desirably 65 nm or less. If the finely-divided silica has an aggregate size in such a range, the finely-divided silica is favorably dispersed while excellent reinforcement and breaking energy are achieved. In addition, good abrasion resistance, crack resistance, and flex crack growth resistance can be achieved.

The aggregate size is also called an aggregate diameter or a maximum frequency Stokes equivalent diameter, and means a particle size in the case where a silica aggregate formed by aggregation of a plurality of primary particles is regarded as one particle. The aggregate size may be measured with a disk centrifugal sedimentation granulometric analysis apparatus such as BI-XDC (produced by Brookhaven Instruments Corporation), for instance.

More specifically, the aggregate size may be measured with BI-XDC by the following method.

3.2 g of silica and 40 mL of deionized water are added to a 50-mL tall beaker, and the beaker containing a silica suspension is placed into a crystallizer filled with ice. In the beaker, the suspension is deagglomerated with an ultrasonic probe (1500-W 1.9-cm VIBRACELL ultrasonic probe (produced by Bioblock, used at 60% of the maximum power output)) for 8 minutes to prepare a sample. 15 mL of the sample is introduced into a disk, stirred, and measured under the conditions of a fixed mode, an analysis time of 120 minutes, and a density of 2.1.

In the apparatus recorder, the values of the diameters passing at 16% by mass, 50% by mass (or median) and 84% by mass and the value of the Mode are recorded (the derivative of the cumulative granulometric curve gives a frequency curve, the abscissa of the maximum of which is known as the "Mode").

By the disk centrifugal sedimentation granulometric analysis method, an average size (by mass) of the particles (i.e. aggregates), marked $D_w$, can be measured after the silica is dispersed in water by ultrasonic deagglomeration. After analysis (sedimentation for 120 minutes), the particle size distribution by mass is calculated by the granulometric analysis apparatus. The average size (by mass) of the particles, marked $D_w$, is calculated by the following equation:

$$\log D_w = \sum_{1}^{n} m_i \log D_i \Big/ \sum_{1}^{n} m_i$$

(In the formula, $m_i$ is the total mass of the particles in the class of $D_i$).

The average primary particle size of the finely-divided silica is desirably 25 nm or less, more desirably 22 nm or less, further desirably 17 nm or less, and particularly desirably 14 nm or less. The lower limit of the average primary particle size is not particularly limited, and is desirably 3 nm or more, more desirably 5 nm or more, and further desirably 7 nm or more. The finely-divided silica having such a small average primary particle size has the aforementioned aggregate size and therefore a structure like that of carbon black. Accordingly, the silica dispersibility is more improved, which further improves reinforcement, abrasion resistance, dynamic strength, crack resistance, and flex crack growth resistance.

The average primary particle size of the finely-divided silica may be determined by observing the silica with a transmission or scanning electron microscope, measuring the sizes of 400 or more primary particles of the silica observed in the visual field, and averaging the sizes of the 400 or more primary particles.

The D50 of the finely-divided silica is desirably 7.0 μm or less, more desirably 5.5 μm or less, and further desirably 4.5 μm or less. If the D50 exceeds 7.0 μm, the silica is actually more poorly dispersed. The D50 of the finely-divided silica is desirably 2.0 μm or more, more desirably 2.5 μm or more, and further desirably 3.0 μm or more. If the D50 is less than 2.0 μm, the aggregate size also tends to be small, and the finely-divided silica is less likely to be sufficiently dispersed.

The D50 as used herein is a median diameter of the finely-divided silica than which 50% by mass of the particles are smaller.

In the finely-divided silica, the proportion of the finely-divided silica whose particle size is larger than 18 μm is desirably 6% by mass or less, more desirably 4% by mass or less, and further desirably 1.5% by mass or less. Thereby, the silica is favorably dispersed, and desired performances are achieved.

The D50 of the finely-divided silica and the proportion of the silica having a specific particle size are determined by the following method.

The aggregation of aggregates is estimated by granulometric measurement (by laser diffraction) carried out on a silica suspension previously deagglomerated by ultrasonication. In this method, the aptitude of the silica for deagglomeration is measured (deagglomeration of the silica particles of 0.1 to tens of microns). The ultrasonic deagglomeration was performed with a VIBRACELL sound wave generator (600 W, produced by Bioblock, used at 80% of the maximum power output) equipped with a probe having a diameter of 19 mm. The granulometric measurement is carried out by laser diffraction on a MALVERN Mastersizer 2000 granulometric analyzer.

More specifically, the measurement is carried out by the following method.

1 g of silica is weighed in a pill box (6 cm in height and 4 cm in diameter), deionized water is added thereto to give a mass of 50 g, and thereby an aqueous suspension containing 2% of silica (this suspension is homogenized by magnetic stirring for 2 minutes) is prepared. Subsequently, ultrasonic deagglomeration is performed for 420 seconds, all the homogenized suspension is introduced into the vessel of the granulometric analyzer, and thereafter granulometric measurement is performed.

The distribution width W of the pore volume of the finely-divided silica is desirably 0.7 or more, more desirably 1.0 or more, further desirably 1.3 or more, and particularly desirably 1.5 or more. The pore distribution width W is desirably 5.0 or less, more desirably 4.0 or less, further desirably 3.0 or less, and particularly desirably 2.0 or less. Such broad pore distribution leads to improvement in silica dispersibility and provides desired performances.

The distribution width W of the pore volume of the silica may be measured by the following method.

The pore volume of the finely-divided silica is measured by mercury porosimetry. A silica sample is pre-dried in an oven at 200° C. for 2 hours. Subsequently, within five minutes after the sample is removed from the oven, the sample is put in a test receptacle, and degassed under vacuum. The pore diameter (AUTOPORE III 9420, porosimeter for powder technology) is calculated by Washburn's equation with a contact angle of 140° and a surface tension γ of 484 dynes/cm (or N/m).

The pore distribution width W may be determined from a pore distribution curve as in FIG. 1 shown by the function of pore diameter (nm) and pore volume (mL/g). More specifically, the diameter Xs (nm) that gives the peak value Ys (mL/g) of the pore volume is recorded, the straight line of Y=Ys/2 is drawn, and then the points a and b at which the straight line intersects the pore distribution curve are obtained. When the abscissas (nm) of the points a and b are Xa and Xb (Ka>Xb), respectively, the pore distribution width W is equivalent to (Xa−Xb)/Xs.

The diameter Xs (nm) that gives the peak value Ys of the pore volume in the pore distribution curve of the finely-divided silica is desirably 10 nm or more, more desirably 15 nm or more, further desirably 18 nm or more, and particularly desirably 20 nm or more. The diameter Xs is desirably 60 nm or less, more desirably 35 nm or less, further desirably 28 nm or less, and particularly desirably 25 nm or less. The diameter Xs in such a range can provide finely-divided silica excellent in dispersibility and reinforcement.

In the rubber composition of the present invention, the amount of the finely-divided silica is desirably 5 parts by mass or more, more desirably 10 parts by mass or more, and further desirably 15 parts by mass or more, per 100 parts by mass of the rubber component. If the amount is less than 5 parts by mass, sufficient reinforcement, mechanical strength, and abrasion resistance tend not to be achieved. The amount of the finely-divided silica is desirably 150 parts by mass or less, more desirably 100 parts by mass or less, and further desirably 80 parts by mass or less, per 100 parts by mass of the rubber component. If the amount exceeds 150 parts by mass, processability may be deteriorated, and good dispersibility is less likely to be secured.

Particularly in the case where the rubber composition is used for a (cap) tread, the amount of the finely-divided silica is desirably 20 parts by mass or more, more desirably 40 parts by mass or more, and further desirably 50 parts by mass or more, per 100 parts by mass of the rubber component. The amount of the finely-divided silica is desirably 120 parts by mass or less, more desirably 95 parts by mass or less, and further desirably 75 parts by mass or less, per 100 parts by mass of the rubber component. If the amount is less than the lower limit or exceeds the upper limit, the same tendency as mentioned above with respect to the amount of the finely-divided silica is shown.

In the case where the rubber composition is used for a sidewall and a base tread, the amount of the finely-divided silica is desirably 10 parts by mass or more, more desirably 20 parts by mass or more, and further desirably 25 parts by mass or more, per 100 parts by mass of the rubber component. The amount of the finely-divided silica is desirably 80 parts by mass or less, more desirably 50 parts by mass or less, and further desirably 40 parts by mass or less, per 100 parts by mass of the rubber component. If the amount is less than the lower limit or exceeds the upper limit, the same tendency as mentioned above with respect to the amount of the finely-divided silica is shown.

The rubber composition of the present invention may contain silica other than the finely-divided silica. In this case, the total amount of silica is desirably 15 parts by mass or more, more desirably 25 parts by mass or more, and further desirably 45 parts by mass or more, per 100 parts by mass of the rubber component. The total amount is desirably 200 parts by mass or less, more desirably 150 parts by mass or less, and further desirably 100 parts by mass or less, per 100 parts by mass of the rubber component. If the amount is less than the lower limit or exceeds the upper limit, the same tendency as mentioned above with respect to the amount of the finely-divided silica is shown.

The rubber composition of the present invention contains a mercapto group-containing silane coupling agent. If finely-divided silica is used in combination with a mercapto group-containing silane coupling agent in a rubber composition containing ENR and silica which tends to cause problems in silica dispersibility, abrasion resistance, crack resistance, flex crack growth resistance, and the like performances, the finely-divided silica tends to retard the vulcanization speed. Therefore, although the mercapto group-containing silane coupling agent is used, an appropriate scorch time is ensured, and good processability is achieved. In addition, such combined use enables uniform dispersion of the finely-divided silica with high reinforcement into the ENR. Accordingly, excellent reinforcement and breaking energy, and good fuel economy, abrasion resistance, crack resistance, and flex crack growth resistance can be achieved.

The mercapto group-containing silane coupling agent is not particularly limited, and examples thereof include 3-mercaptopropyltrimethoxysilane, 3-mercaptopropyltriethoxysilane, 2-mercaptoethyltrimethoxysilane, and 2-mercaptoethyltriethoxysilane.

Suitably used among these is a silane coupling agent that is a copolymer comprising units A represented by formula (1) and units B represented by formula (2), in which the proportion of the units B is 1 to 70 mol % of the total molar amount of the units A and the units B:

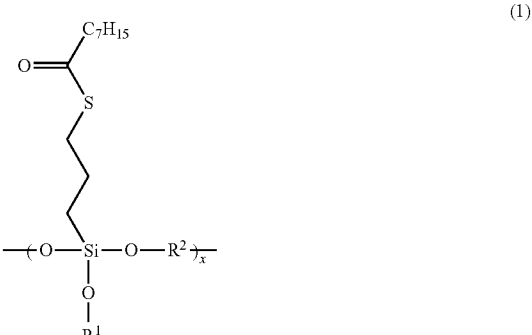

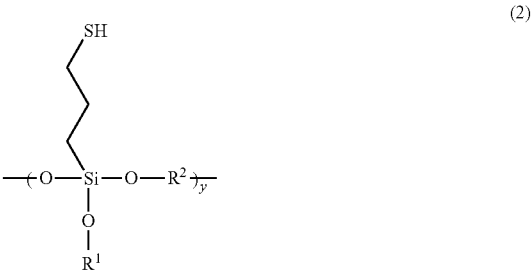

In formulae (1) and (2), x and y each are an integer of one or more, $R^1$ represents hydrogen, halogen, a branched or unbranched $C_{1-30}$ alkyl or alkylene group, a branched or unbranched $C_{2-30}$ alkenyl or alkenylene group, a branched or unbranched $C_{2-30}$ alkynyl or alkynylene group, or a group in which a hydrogen atom at the end of the alkyl or alkenyl group is replaced with a hydroxy or carboxyl group, $R^2$ represents hydrogen, a branched or unbranched $C_{1-30}$ alkylene or alkyl group, a branched or unbranched $C_{2-30}$ alkenylene or alkenyl group, or a branched or unbranched $C_{2-30}$ alkynylene or alkynyl group, and $R^1$ and $R^2$ may form a ring structure together.

A mercapto group-containing silane coupling agent is highly reactive, and highly improves the silica dispersibility. However, the silane coupling agent has drawbacks in that scorch time is short, and the rubber composition is very likely to scorch upon finishing kneading and extrusion. Also since ENR or NR is often vulcanized with a large amount of a vulcanization accelerator in order to inhibit reversion, it is difficult to use the mercapto group-containing silane coupling agent.

In contrast, in the silane coupling agent having the above structure, the molar ratio of the unit A and the unit B satisfies the aforementioned condition. Thus, such a silane coupling agent suppresses an increase in viscosity upon processing in comparison with polysulfide silanes such as bis-(3-triethoxysilylpropyl)tetrasulfide. This is presumably for the following reason. Since the sulfide portion of the unit A is a C—S—C bond, the sulfide portion is thermally stable compared with tetrasulfide or disulfide. Accordingly, an increase in Mooney viscosity is small.

In the case where the molar ratio of the unit A and the unit B satisfies the condition, the silane coupling agent suppresses a reduction in scorch time in comparison with mercaptosilanes such as 3-mercaptopropyltrimethoxysilane. This is presumably for the following reason. The unit B has a mercaptosilane structure, and the —SH group of the unit B is covered with the —$C_7H_{15}$ portion of the unit A. Accordingly, the —SH group is less likely to react with polymers. Thereby, scorch time is less likely to be reduced, and viscosity is less likely to increase.

Examples of the halogen for $R^1$ include chlorine, bromine, and fluorine.

Examples of the branched or unbranched $C_{1-30}$ alkyl group for $R^1$ and $R^2$ include a methyl group, an ethyl group, an n-propyl group, an isopropyl group, an n-butyl group, an iso-butyl group, a sec-butyl group, a tert-butyl group, a pentyl group, a hexyl group, a heptyl group, a 2-ethylhexyl group, an octyl group, a nonyl group, and a decyl group. The number of carbons of the alkyl group is desirably 1 to 12.

Examples of the branched or unbranched $C_{1-30}$ alkylene group for $R^1$ and $R^2$ include an ethylene group, a propylene group, a butylene group, a pentylene group, a hexylene group, a heptylene group, an octylene group, a nonylene group, a decylene group, an undecylene group, a dodecylene group, a tridecylene group, a tetradecylene group, a pentadecylene group, a hexadecylene group, a heptadecylene group, and an octadecylene group. The number of carbons of the alkylene group is desirably 1 to 12.

Examples of the branched or unbranched $C_{2-30}$ alkenyl group for $R^1$ and $R^2$ include a vinyl group, a 1-propenyl group, a 2-propenyl group, a 1-butenyl group, a 2-butenyl group, a 1-pentenyl group, a 2-pentenyl group, a 1-hexenyl group, a 2-hexenyl group, and a 1-octenyl group. The number of carbons of the alkenyl group is desirably 2 to 12.

Examples of the branched or unbranched $C_{2-30}$ alkenylene group for $R^1$ and $R^2$ include a vinylene group, a 1-propenylene group, a 2-propenylene group, a 1-butenylene group, a 2-butenylene group, a 1-pentenylene group, a 2-pentenylene group, a 1-hexenylene group, a 2-hexenylene group, and a 1-octenylene group. The number of carbons of the alkenylene group is desirably 2 to 12.

Examples of the branched or unbranched $C_{2-30}$ alkynyl group for $R^1$ and $R^2$ include an ethynyl group, a propynyl group, a butynyl group, a pentynyl group, a hexynyl group, a heptynyl group, an octynyl group, a nonynyl group, a decynyl group, an undecynyl group, and a dodecynyl group. The number of carbons of the alkynyl group is desirably 2 to 12.

Examples of the branched or unbranched $C_{2-30}$ alkynylene group for $R^1$ and $R^2$ include an ethynylene group, a propynylene group, a butynylene group, a pentynylene group, a hexynylene group, a heptynylene group, an octynylene group, a nonynylene group, a decynylene group, an undecynylene group, and a dodecynylene group. The number of carbons of the alkynylene group is desirably 2 to 12.

In the silane coupling agent having the above structure, the total number of repetition (x+y) of the number of repetition (x) of the unit A and the number of repetition (y) of the unit B is desirably 3 to 300. If the total number is within such a range, the —$C_7H_{15}$ of the unit A covers the mercaptosilane of the unit B. Accordingly, the reduction in scorch time can be suppressed, and simultaneously, good reactivity with silica and a rubber component can be secured.

Examples of the silane coupling agent having the above structure include NXT-Z30, NXT-Z45, and NXT-Z60, all produced by Momentive Performance Materials. These may be used alone, or two or more kinds thereof may be used in combination.

The amount of the mercapto group-containing silane coupling agent is desirably 0.5 parts by mass or more, more desirably 1.5 parts by mass or more, further desirably 2.5 parts by mass or more, and most desirably 3.5 parts by mass or more, per 100 parts by mass of the finely-divided silica. If the amount is less than 0.5 parts by mass, the finely-divided silica is less likely to be favorably dispersed. The amount is desirably 20 parts by mass or less, more desirably 15 parts by mass or less, further desirably 10 parts by mass or less, and most desirably 5 parts by mass or less, per 100 parts by mass of the finely-divided silica. If the amount exceeds 20 parts by mass, the dispersion of the finely-divided silica tends not to be improved according to the added amount, and the cost tends to increase unnecessarily. In addition, scorch time tends to be reduced, and processability in kneading and extrusion tends to be deteriorated.

The rubber composition of the present invention may contain a mixture of a zinc salt of an aliphatic carboxylic acid and a zinc salt of an aromatic carboxylic acid (such as Activator 73A produced by Struktol Company), and/or a zinc salt of a $C_{4-16}$ (desirably $C_{6-14}$, more desirably $C_{6-12}$, and further desirably $C_{6-10}$) aliphatic carboxylic acid (such as Struktol ZEH produced by Struktol Company (zinc 2-ethylhexanoate)).

These ingredients retard vulcanization, improve scorch time which may be too short when a mercapto group-containing silane coupling agent is used, and improve the silica dispersibility. These ingredients also improve the resistance to the reversion of ENR or NR, simultaneously achieve both excellent handling stability and wet grip performance, as well as favorable rolling resistance. The use of these ingredients reduces excess sulfur and sulfur crosslinking in an unfavorable form, provides an effective and stable crosslinking point, and provides a rubber composition with rigidity required for handling stability. In addition, these ingredients provide a rubber composition with flexibility under the conditions of low temperatures, which relate to wet grip performance, and small distortion required for grip performance. Accordingly, these ingredients provide a tread rubber with high grip especially under wet conditions. These ingredients also provide a tread rubber that has favorable rolling resistance and abrasion resistance owing to small amounts of excess sulfur and sulfur crosslinking in an unfavorable form, and is excellent in durability so that performances do not change so much during use.

In addition, these ingredients provide a sidewall rubber and a base tread rubber which are excellent in rolling resistance and durability.

Examples of the aliphatic carboxylic acid in the zinc salt of an aliphatic carboxylic acid in the mixture include aliphatic carboxylic acids derived from vegetable oils such as coconut oil, palm kernel oil, camellia oil, olive oil, almond oil, canola oil, peanut oil, rice bran oil, cacao butter, palm oil, soybean oil, cottonseed oil, sesame oil, linseed oil, castor oil and rapeseed oil; aliphatic carboxylic acids derived from animal oils such as beef tallow; and aliphatic carboxylic acids chemically synhthesized from petroleum or the like. Desirable are aliphatic carboxylic acids derived from vegetable oils, and more desirable are aliphatic carboxylic acids derived from coconut oil, palm kernel oil or palm oil, because it is possible to be environment-friendly, to prepare for a future decrease in oil supply, and to inhibit reversion sufficiently.

In the mixture, the number of carbons in the aliphatic carboxylic acid is desirably 4 or more, and more desirably 6 or more. If the number of carbons in the aliphatic carboxylic acid is less than 4, the dispersibility tends to decrease. The number of carbons in the aliphatic carboxylic acid is desirably 16 or less, more desirably 14 or less, and further desirably 12 or less. If the number of carbons in the aliphatic carboxylic acid exceeds 16, reversion tends not to be sufficiently inhibited.

Here, the aliphatic group in the aliphatic carboxylic acid may be one having a chain structure such as an alkyl group or one having a ring structure such as a cycloalkyl group.

Examples of the aromatic carboxylic acid in the zinc salt of an aromatic carboxylic acid in the mixture include benzoic acid, phthalic acid, mellitic acid, hemimellitic acid, trimellitic acid, diphenic acid, toluic acid, and naphthoic acid. Among these, benzoic acid, phthalic acid, or naphthoic acid is desirable because it is possible to inhibit reversion sufficiently.

The content ratio between the zinc salt of an aliphatic carboxylic acid and the zinc salt of an aromatic carboxylic acid in the mixture (molar ratio: (zinc salt of aliphatic carboxylic acid)/(zinc salt of aromatic carboxylic acid), hereinafter referred to as the "content ratio") is desirably 1/20 or more, more desirably 1/15 or more, and further desirably 1/10 or more. Ti the content ratio is less than 1/20, it may be impossible to be environment-friendly and to prepare for a future decrease in oil supply, and the dispersibility and stability of the mixture tend to be deteriorated. Also, the content ratio is desirably 20/1 or less, more desirably 15/1 or less, and further desirably 10/1 or less. If the content ratio is more than 20/1, reversion tends not to be sufficiently inhibited.

The zinc content in the mixture is desirably 3% by mass or more, and more desirably 5% by mass or more. If the zinc content in the mixture is less than 3% by mass, reversion tends not to be sufficiently inhibited. Also, the zinc content in the mixture is desirably 30% by mass or less, and more desirably 25% by mass or less. If the zinc content in the mixture exceeds 30% by mass, processability tends to decrease and the cost tends to unnecessarily increase.

The aliphatic carboxylic acid in the zinc salt of a $C_{4-16}$ aliphatic carboxylic acid may be either linear or branched, and may be one with a ring structure such as a cycloalkyl group. The aliphatic carboxylic acid may be either a saturated fatty acid or unsaturated fatty acid. The aliphatic carboxylic acid may be an aliphatic polycarboxylic acid such as an aliphatic dicarboxylic acid or aliphatic tricarboxylic acid.

Examples of the aliphatic carboxylic acid in the zinc salt of a $C_{4-16}$ aliphatic carboxylic acid include: saturated fatty acids such as butanoic acid, pentanoic acid, hexanoic acid, heptanoic acid, octanoic acid, nonanoic acid, decanoic acid, undecanoic acid, dodecanoic acid, isobutyric acid, isopentanoic acid, pivalic acid, isohexanoic acid, isoheptanoic acid, isooctanoic acid, dimethyloctanoic acid, isononanoic acid, isodecanoic acid, isoundecanoic acid, isododecanoic acid, 2-ethylbutyric acid, 2-ethylhexanoic acid, 2-butyloctanoic acid, succinic acid, glutaric acid, adipic acid, pimelic acid, suberic acid, and sebacic acid; and unsaturated fatty acids such as butenoic acid, pentenoic acid, hexenoic acid, heptenoic acid, octenoic acid, nonenoic acid, decenoic acid, undecenoic acid, and dodecenoic acid. Particularly desirable among these is 2-ethylhexanoic acid because it highly inhibits reversion, and is industrially rich and inexpensive. These may be used alone, or two or more kinds thereof may be used in combination.

The total amount of the mixture and the zinc salt of a $C_{4-16}$ aliphatic carboxylic acid is desirably 0.2 parts by mass or more, more desirably 0.5 parts by mass or more, and further desirably 1 part by mass or more, per 100 parts by mass of the rubber component. If the total amount is less than 0.2 parts by mass, sufficient reversion resistance and effect of improving crosslink density may not be secured, and thereby it tends to be difficult to reduce rolling resistance, and to improve handling stability, and the like. The total amount is desirably 10 parts by mass or less, more desirably 7 parts by mass or less, and further desirably 5 parts by mass or less, per 100 parts by mass of the rubber component. If the total amount exceeds 10 parts by mass, blooming may occur, and improvement of the effects by the added amount may become smaller, resulting in an unnecessary increase in cost.

The rubber composition of the present invention may contain an alkaline fatty acid metal salt. The alkaline fatty acid metal salt neutralizes an acid used in ENR synthesis, and can prevent thermal degradation of ENR upon kneading and vulcanization. In addition, reversion can also be inhibited.

Examples of the metal in the alkaline fatty acid metal salt include sodium, potassium, calcium, and barium. Desirable among these are calcium and barium in terms of high effect of improving heat resistance and high compatibility with epoxidized natural rubber. Specific examples of the alkaline fatty acid metal salt include metal stearates such as sodium stearate, magnesium stearate, calcium stearate, and barium stearate; and metal oleates such as sodium oleate, magnesium oleate, calcium oleate, and barium oleate. Desirable among these are calcium stearate and calcium oleate because of their high effects of improving heat resistance, high compatibility with epoxidized natural rubber, and comparatively low cost.

The amount of the alkaline fatty acid metal salt is desirably 1 part by mass or more, more desirably 1.5 parts by mass or more, and further desirably 3 parts by mass or more, per 100 parts by mass of the ENR. If the amount is less than 1 part by mass, sufficient heat resistance and reversion resistance are less likely to be achieved. The amount of the alkaline fatty acid metal salt is desirably 10 parts by mass or less, and more desirably 8 parts by mass or less, per 100 parts by mass of the ENR. If the amount exceeds 10 parts by mass, breaking strength and abrasion resistance tend to be deteriorated.

The rubber composition of the present invention may contain fatty acids such as stearic acid, palmitic acid, myristic acid, lauric acid, caprylic acid, oleic acid, and linolic acid. Among these, stearic acid is desirable because of its low cost.

In the rubber composition of the present invention, the total amount of the alkaline fatty acid metal salt, the mixture of a zinc salt of an aliphatic carboxylic acid and a zinc salt of an aromatic carboxylic acid, the zinc salt of a $C_{4-16}$ aliphatic carboxylic acid, and the fatty acid is desirably 2.5 parts by mass or more, more desirably 4 parts by mass or more, further desirably 6 parts by mass or more, and particularly desirably 7 parts by mass or more, per 100 parts by mass of the rubber component. If the total amount is less than 2.5 parts by mass, the degradation of the ENR, and reversion tend not to be sufficiently inhibited, and the efficiency of effectively cross-linking added sulfur tends not to be improved. The total amount of the ingredients is desirably 20 parts by mass or less, more desirably 17 parts by mass or less, and further desirably 12 parts by mass or less, per 100 parts by mass of the rubber component. If the total amount exceeds 20 parts by mass, rolling resistance tends to be deteriorated, and abrasion resistance, dynamic strength (breaking energy), and mechanical strength (crack resistance and flex crack growth resistance) may be actually reduced.

In the case where the rubber composition is used for a tread, the total amount of the ingredients is desirably 2.5 parts by mass or more, more desirably 4 parts by mass or more, further desirably 6 parts by mass or more, and particularly desirably 7 parts by mass or more, per 100 parts by mass of the rubber component. The total amount is desirably 20 parts by mass or less, more desirably 17 parts by mass or less, and further desirably 12 parts by mass or less, per 100 parts by mass of the rubber component. If the total amount is less than the lower limit or exceeds the upper limit, the same tendency as mentioned above with respect to the total amount of the ingredients is shown.

In the case where the rubber composition is used for a sidewall and a base tread, the total amount of the ingredients is desirably 2.5 parts by mass or more, more desirably 3.0 parts by mass or more, and further desirably 3.5 parts by mass or more, per 100 parts by mass of the rubber component. The total amount is desirably 20 parts by mass or less, more desirably 10 parts by mass or less, and further desirably 8 parts by mass or less, per 100 parts by mass of the rubber component. If the total amount is less than the lower limit or exceeds the upper limit, the same tendency as mentioned above with respect to the total amount of the ingredients is shown.

The rubber composition may optionally contain compounding ingredients generally used in the rubber industry, in addition to the aforementioned ingredients. Examples of the compounding ingredients include fillers such as carbon black, oils or plasticizers, antioxidants, age resistors, zinc oxide, vulcanizing agents such as sulfur and sulfur-containing compounds, and vulcanization accelerators.

The rubber composition of the present invention is produced by a usual method. More specifically, the rubber composition is produced, for example, by a method including kneading the aforementioned ingredients with an apparatus such as a Banbury mixer, a kneader, or an open roll mill, and then vulcanizing the resultant mixture. The rubber composition may be used for each tire component, and is particularly suitably used for a (cap) tread, a sidewall, and a base tread.

Suitable as a method for producing a rubber composition containing NR, ENR, and silica is a method including: (I) kneading natural rubber and silica; and (II) kneading epoxidized natural rubber. The method is particularly suitable for producing a rubber composition for a sidewall or a base tread.

The amount of the NR in the kneading process (I) is desirably 40 to 100% by mass, and particularly desirably 100% by mass, of the total amount of the NR used through all the kneading processes, in terms of processability. The amount of the silica in the kneading process (I) is desirably 80 to 100% by mass, and particularly desirably 100% by mass, of the total amount of the silica used through all the kneading processes, in terms of flex crack growth resistance. In the kneading process (I), other chemical agents to be added in the rubber composition, such as a softening agent, an age resistor, stearic acid, and zinc oxide, may be added.

The amount of the ENR in the kneading process (II) is desirably 50 to 100% by mass, and particularly desirably 100% by mass, of the total amount of the ENR used through all the kneading processes, in terms of flex crack growth resistance. The aforementioned alkaline fatty acid metal salt is desirably mixed in the kneading process (II).

The pneumatic tire of the present invention is produced by a common method with the above rubber composition.

More specifically, an unvulcanized rubber composition containing the aforementioned ingredients is extruded and processed into a shape of a tire component such as a tread, a sidewall, or a base tread, and then molded with other tire components in a usual manner on a tire building machine to form an unvulcanized tire. Then, the unvulcanized tire is heated and pressurized in a vulcanizer to produce a tire.

The application of the pneumatic tire produced using the rubber composition of the present invention is not particularly limited, and the pneumatic tire may be suitably used particularly as high performance tires (very low-profile tires, racing tires, and the like tires), and tires for heavy load vehicles among passenger vehicles.

EXAMPLES

The present invention is more specifically described based on examples, and the present invention is not limited to these examples.

In the following, the respective chemical agents used in Examples and Comparative Examples are listed.

Epoxidized natural rubber 1 (ENR-25): produced by MRB (in Malaysia) (epoxidation degree: 25 mol %, Tg: −47° C.)

Epoxidized natural rubber 2 (ENR-37.5): trial product (produced by MRB (in Malaysia), epoxidation degree: 37.5 mol %, Tg: −35° C.)

BR1: BR150B produced by Ube Industries, Ltd. (cis 1,4 bond content: 97% by mass, $ML_{1+4}$ (100° C.): 40, viscosity of 5% solution in toluene at 25° C.: 48 cps, Mw/Mn: 3.3)

BR2: trial product BR A produced by Ube Industries, Ltd. (cis 1,4 bond content: 98% by mass, $ML_{1+4}$ (100° C.): 47, viscosity of 5% solution in toluene at 25° C.: 122 cps, Mw/Mn: 3.3)

NR: RSS#3

Silica 1: Zeosil 1115 MP produced by Rhodia (CTAB specific surface area: 105 m$^2$/g, BET specific surface area: 115 m$^2$/g, average primary particle size: 25 nm, aggregate size: 92 nm, pore distribution width W: 0.63, diameter Xs that gives pore volume peak in pore distribution curve: 60.3 nm)

Silica 2: Zeosil HRS 1200 MP produced by Rhodia (CTAB specific surface area: 195 m$^2$/g, BET specific surface area: 200 m$^2$/g, average primary particle size: 15 nm, aggregate size: 40 nm, D50: 6.5 μm, proportion of particles exceeding 18 μm in size: 5.0% by mass, pore distribution width W: 0.40, diameter Xs that gives pore volume peak in pore distribution curve: 18.8 nm)

Silica 3: Zeosil Premium 200 MP produced by Rhodia (CTAB specific surface area: 200 m$^2$/g, BET specific surface area: 220 m$^2$/g, average primary particle size: 10 nm, aggregate size: 65 nm, D50: 4.2 μm, proportion of particles exceeding 18 μm in size: 1.0% by mass, pore distribution width W: 1.57, diameter Xs that gives pore volume peak in pore distribution curve: 21.9 nm)

Silane coupling agent 1: Si69 produced by Degussa AG (bis(3-triethoxysilylpropyl)tetrasulfide)

Silane coupling agent 2: NXT-Z45 produced by Momentive Performance Materials (copolymer of unit A and unit B (unit A: 55 mol %, unit B: 45 mol %))

Silane coupling agent 3: Si363 produced by Degussa AG (content of mercapto group: 3.3%)

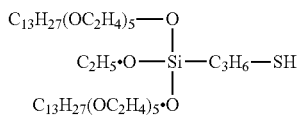

Vegetable oil: refined soybean oil (S) produced by The Nisshin OilliO Group, Ltd. (iodine value: 131, fatty acid component having 18 or more carbons: 84.9%)

Alkaline fatty acid metal salt: calcium stearate produced by NOF Corporation

Stearic acid: "KIRI" produced by NOF Corporation

Anti-reversion agent (mixture of zinc salt of aliphatic carboxylic acid and zinc salt of aromatic carboxylic acid): Activator 73A produced by Struktol Company ((i) zinc salt of aliphatic carboxylic acid: zinc salt of fatty acid ($C_{8-12}$) derived from coconut oil, (ii) zinc salt of aromatic carboxylic acid:zinc benzoate, content molar ratio: 1/1, zinc content: 17% by mass)

Zinc oxide: Zinc oxide #2 produced by Mitsui Mining & Smelting Co., Ltd.

Age resistor: Nocrac 6C produced by Ouchi Shinko Chemical Industrial Co., Ltd. (N-(1,3-dimethylbutyl)-N'-phenyl-p-phenylenediamine)

Wax 1: Sunnoc Wax produced by Ouchi Shinko Chemical Industrial Co., Ltd.

Wax 2: Ozoace 0355 produced by Nippon Seiro Co., Ltd.

Sulfur: sulfur powder produced by Tsurumi Chemical industry Co., Ltd.

Vulcanization accelerator TBBS: Nocceler NS produced by Ouchi Shinko Chemical Industrial Co., Ltd. (N-tert-butyl-2-benzothiazolylsulfenamide)

Examples 1 to 7 and Comparative Examples 1 to 7

According to the respective formulations shown in Table 1, formulation materials other than the sulfur and the vulcanization accelerator were kneaded by a 1.7-L Banbury mixer for 5 minutes to give an outlet temperature of 150° C., so that a kneaded mass was formed. To the resulting kneaded mass were added the sulfur and the vulcanization accelerator, and they were kneaded by an open two-roll mill at 80° C. for 3 minutes to provide an unvulcanized rubber composition.

The resultant unvulcanized rubber composition was press-vulcanized at 150° C. for 30 minutes to produce a vulcanized rubber sheet.

In addition, the resultant unvulcanized rubber composition was molded into a tread shape, assembled with other tire components, and then vulcanized at 150° C. for 30 minutes. Thus, test tires were produced.

Examples 8 to 12 and Comparative Examples 8 to 12

The chemical agents in amounts shown in Process 1 in Table 2 were kneaded with a Banbury mixer for 5 minutes to give an outlet temperature of about 150° C. Once discharged, the kneaded mass formed in Process 1 was added with the epoxidized natural rubber 1 and the alkaline fatty acid metal salt in amounts shown in Process 2, and the resultant mixture was kneaded to give an outlet temperature of about 150° C. Thereafter, the sulfur and the vulcanization accelerator in amounts shown in Process 3 were kneaded into the mixture obtained in Process 2 with an open roll mill at about 80° C. for 3 minutes, whereby an unvulcanized rubber composition was produced.

The resulting unvulcanized rubber composition was press-vulcanized at 150° C. for 30 minutes to provide a vulcanized rubber sheet and a vulcanized rubber test piece.

In addition, the resulting unvulcanized rubber composition was molded into a sidewall shape and a base tread shape, assembled with other tire components, and then vulcanized at 150° C. for 30 minutes to provide a test tire.

The produced unvulcanized rubber compositions, vulcanized rubber sheets, vulcanized rubber test pieces, and test tires were evaluated as follows. Tables 1 and 2 show the test results.

(1) Breaking Energy Index

The tensile strength and elongation at break of each vulcanized rubber sheet were measured in accordance with JIS K6251 "Rubber, vulcanized or thermoplastic—Determination of tensile stress-strain properties". Then, the breaking energy was calculated by the formula:

"(tensile strength)×(elongation at break)/2", and the breaking energy index was calculated by the following formula.

(Breaking energy index)=(Breaking energy of each formulation)/(Breaking energy of Comparative Example 1 or 8)×100

(2) Abrasion Resistance Test (Abrasion Test)

The produced test tires were mounted on a vehicle, and the decrease in the depth of tire grooves was measured after the vehicle had run 8000 km in a city area. Then, the running distance that decreased the depth of tire grooves by 1 mm was calculated. The abrasion resistance index of Comparative Example 1 was regarded as 100, and the decrease in the depth of the tire grooves of each formulation was expressed as an index by the following equation. The larger the abrasion resistance index is, the better the abrasion resistance is.

(Abrasion resistance index)=(Running distance that decreased tire groove depth by 1 mm in each formulation)/(Running distance that decreased tire groove depth by 1 mm in Comparative Example 1)×100

(3) Scorch Time

According to the description of JIS K6300, a Mooney scorch test was performed by the physical testing method of unvulcanized rubber, and t10 [minutes] at 130.0±0.5° C. was measured. The t10 was expressed as an index (Mooney scorch time index) relative to that of a criterion formulation (Comparative Example 1 or 8) regarded as 100. If scorch time is short, problematically, rubber scorch tends to occur. In this evaluation, if the index is 70 or less, the problem of rubber scorch may occur in processes such as finishing kneading and extrusion.

(4) Rolling Resistance Test

A vulcanized rubber sheet (2 mm×130 mm×130 mm) was produced, and a test piece for measurement was cut out from the vulcanized rubber sheet. Then, the tan δ of each test piece was determined with a viscoelasticity spectrometer VES (produced by Iwamoto Seisakusho Co., Ltd.) under the following conditions: a temperature of 50° C.; an initial strain of 10%; a dynamic strain of 2%; and a frequency of 10 Hz. The rolling resistance index of Comparative Example 1 or 8 was regarded as 100, and the rolling resistance of each formulation was expressed as an index by the following equation. The smaller the rolling resistance index is, the smaller and better the rolling resistance is.

(Rolling resistance index)=[(Tan δ of each formulation)/(Tan δ of Comparative Example 1 or 8)]×100

(5) Silica Dispersion Index

A vulcanized rubber sheet (2 mm×130 mm×130 mm) was produced as a vulcanized rubber composition, and a test piece for measurement was cut out from the vulcanized rubber sheet. In conformity with JIS K6812 "Method for the assessment of the degree of pigment or carbon black dispersion in polyolefin pipes, fittings and compounds", the number of silica agglomerates in the vulcanized rubber composition was counted, and the dispersion ratio (%) thereof was calculated. The dispersion ratio of a criterion formulation (Comparative Example 1 or 8) was regarded as 100, and the silica dispersion ratio of each formulation was expressed as an index by the following equation. The larger the silica dispersion index is, the more favorably the silica is dispersed, and the better the silica dispersibility is.

(Silica dispersion index)=[(Dispersion ratio of each formulation)/(Dispersion ratio of Comparative Example 1 or 8)]×100

(6) Wet Grip Performance

The wet grip performance was evaluated based on a braking performance obtained by the Anti-Lock Brake System (ABS) evaluation test. That is, the above-mentioned test tires were mounted on a 1800-cc class passenger vehicle equipped with an ABS, an actual vehicle running test was performed on an asphalt road surface (wet road surface state, skid number: about 50), and the deceleration was calculated which was a distance required for the vehicle to stop after the brakes were applied at 100 km/h on the wet asphalt road surface. The wet grip performance index of Comparative Example 1 was regarded as 100, and the deceleration of each formulation was expressed as a wet grip performance index by the following equation. The larger the wet grip performance index is, the better the braking performance is, and the better the wet grip performance is.

(Wet grip performance index)=(Deceleration of Comparative Example 1)/(Deceleration of each formulation)×100

(7) Dry Grip Performance

The test tires were mounted on a passenger vehicle, an actual vehicle running test was performed on a dry asphalt road surface in a test course, and performances such as handling responsiveness, rigidity, and grip were evaluated based on a sensory evaluation by a driver. The performance result of each formulation was expressed as an index (dry grip performance index) relative to that of Comparative Example 1 regarded as 100. The larger the index value is, the better the dry grip performance and handling stability are.

(8) Tear Test

In conformity with JIS K6252 "Rubber, vulcanized or thermoplastic—Determination of tear strength", the tear strength (N/mm) was determined with an unnicked angle test piece (vulcanized rubber sheet). The tear strength of a criterion formulation (Comparative Example 8) was regarded as 100, and the tear strength index was calculated by the following equation. The larger the tear strength index is, the higher and better the tear strength is.

(Tear strength index)=(Tear strength of each formulation)/(Tear strength of Comparative Example 8)×100

(9) Test of Flex Crack Growth (De Mattia)

In conformity with JIS K6260 "Testing method of flex cracking and crack growth for rubber, vulcanized or thermoplastic (De Mattia)", the crack length of each vulcanized rubber test piece sample after 1 million test cycles or the number of test cycles until a crack had grown 1 mm in each sample was measured under the conditions of: a temperature of 23° C. and a relative humidity of 55%. Based on the obtained number of test cycles and crack length, the number of flexing cycles until a crack had grown 1 mm in each sample was expressed as the common logarithm, the common logarithm of Comparative Example 8 was regarded as 100, and the common logarithm of each formulation was expressed as an index as follows. Here, the percentages of 70% and 110% each mean an elongation rate relative to the length of the original vulcanized rubber test piece sample. The larger the common logarithm index is, the less likely the crack grows, and the better the flex crack growth resistance is.

(Flex crack growth (De Mattia) index (70%, 110%))= [(Common logarithm of flexing cycle number until crack had grown 1 mm in each formulation)/(Common logarithm of flexing cycle number until crack had grown 1 mm in Comparative Example 8)]×100

(10) Constant Stretching Fatigue Test

The constant amplitude of cyclic strain repeating stretching test of each vulcanized rubber sheet was performed with a No. 3 dumbbell under the conditions of a maximum strain of 50% and a frequency of 5 Hz, without forming an initial crack in advance. After this test was repeated 5 million cycles, a broken vulcanized rubber sheet was evaluated as "C", a cracked or damaged vulcanized rubber sheet was evaluated as "B", and an intact vulcanized rubber sheet was evaluated as "A".

TABLE 1

Rubber composition for a tread

| | | | Examples | | | | | | |
|---|---|---|---|---|---|---|---|---|---|
| | | | 1 | 2 | 3 | 4 | 5 | 6 | 7 |
| Formulation (parts by mass) | Process 1 | Epoxidized natural rubber 1 | 100 | 100 | 100 | 100 | 100 | 70 | — |
| | | Epoxidized natural rubber 2 | — | — | — | — | — | — | 70 |
| | | BR1 | — | — | — | — | — | 30 | — |
| | | BR2 | — | — | — | — | — | — | 30 |
| | | Silica 1 | — | — | — | — | — | — | — |
| | | Silica 2 | — | — | — | 65 | — | — | — |
| | | Silica 3 | 65 | 65 | 65 | — | 65 | 65 | 65 |
| | | Silane coupling agent 1 | — | — | — | — | — | — | — |
| | | Silane coupling agent 2 | 2.6 | 2.6 | 2.6 | 2.6 | — | 2.6 | 2.6 |
| | | Silane coupling agent 3 | — | — | — | — | 2.0 | — | — |

TABLE 1-continued

Rubber composition for a tread

|  |  |  |  |  |  |  |  |  |
|---|---|---|---|---|---|---|---|---|
|  |  | Vegetable oil | 5 | 5 | 5 | 5 | 5 | 5 | 5 |
|  |  | Alkaline fatty acid metal salt | 5 | 5 | 5 | 5 | 5 | 5 | 5 |
|  |  | Stearic acid | 2 | — | 2 | — | 2 | 2 | 2 |
|  |  | Anti-reversion agent | — | 3 | 3 | 3 | 3 | — | — |
|  |  | Zinc oxide | 3 | 3 | 3 | 3 | 3 | 3 | 3 |
|  |  | Age resistor | 1.5 | 1.5 | 1.5 | 1.5 | 1.5 | 1.5 | 1.5 |
|  |  | Wax 1 | 1.5 | 1.5 | 1.5 | 1.5 | 1.5 | 1.5 | 1.5 |
|  | Process 2 | Sulfur | 2.1 | 2.1 | 2.1 | 2.1 | 2.1 | 2.1 | 2.1 |
|  |  | Vulcanization accelerator TBBS | 2.0 | 2.0 | 2.0 | 2.0 | 2.0 | 2.0 | 2.0 |
| Test results | Breaking energy index |  | 155 | 149 | 145 | 122 | 135 | 140 | 138 |
|  | Abrasion resistance index |  | 111 | 112 | 108 | 104 | 107 | 121 | 118 |
|  | Mooney scorch time index |  | 87 | 126 | 129 | 102 | 77 | 86 | 86 |
|  | Rolling resistance index |  | 93 | 100 | 104 | 102 | 104 | 89 | 103 |
|  | Silica dispersion index |  | 100 | 103 | 102 | 95 | 100 | 101 | 97 |
|  | Wet grip performance index |  | 109 | 104 | 103 | 103 | 106 | 106 | 118 |
|  | Dry grip performance index |  | 100 | 104 | 105 | 102 | 100 | 100 | 105 |

|  |  |  | Comparative Examples | | | | | | |
|---|---|---|---|---|---|---|---|---|---|
|  |  |  | 1 | 2 | 3 | 4 | 5 | 6 | 7 |
| Formulation (parts by mass) | Process 1 | Epoxidized natural rubber 1 | 100 | 100 | 100 | 100 | 100 | 70 | — |
|  |  | Epoxidized natural rubber 2 | — | — | — | — | — | — | 70 |
|  |  | BR1 | — | — | — | — | — | 30 | — |
|  |  | BR2 | — | — | — | — | — | — | 30 |
|  |  | Silica 1 | 75 | — | — | 75 | 75 | 75 | 75 |
|  |  | Silica 2 | — | — | 65 | — | — | — | — |
|  |  | Silica 3 | — | 65 | — | — | — | — | — |
|  |  | Silane coupling agent 1 | 6.0 | 5.2 | 5.2 | — | — | 6.0 | 6.0 |
|  |  | Silane coupling agent 2 | — | — | — | 3.0 | — | — | — |
|  |  | Silane coupling agent 3 | — | — | — | — | 2.3 | — | — |
|  |  | Vegetable oil | 5 | 5 | 5 | 5 | 5 | 5 | 5 |
|  |  | Alkaline fatty acid metal salt | 5 | 5 | 5 | 5 | 5 | 5 | 5 |
|  |  | Stearic acid | 2 | 2 | 2 | 2 | 2 | 2 | 2 |
|  |  | Anti-reversion agent | — | — | — | — | — | — | — |
|  |  | Zinc oxide | 3 | 3 | 3 | 3 | 3 | 3 | 3 |
|  |  | Age resistor | 1.5 | 1.5 | 1.5 | 1.5 | 1.5 | 1.5 | 1.5 |
|  |  | Wax 1 | 1.5 | 1.5 | 1.5 | 1.5 | 1.5 | 1.5 | 1.5 |
|  | Process 2 | Sulfur | 2.1 | 2.1 | 2.1 | 2.1 | 2.1 | 2.1 | 2.1 |
|  |  | Vulcanization accelerator TBBS | 2.0 | 2.0 | 2.0 | 2.0 | 2.0 | 2.0 | 2.0 |
| Test results | Breaking energy index |  | 100 | 119 | 92 | 114 | 98 | 98 | 85 |
|  | Abrasion resistance index |  | 100 | 104 | 92 | 103 | 98 | 111 | 91 |
|  | Mooney scorch time index |  | 100 | 99 | 101 | 68 | 20 | 100 | 100 |
|  | Rolling resistance index |  | 100 | 100 | 106 | 95 | 97 | 96 | 110 |
|  | Silica dispersion index |  | 100 | 88 | 83 | 105 | 103 | 102 | 95 |
|  | Wet grip performance index |  | 100 | 101 | 94 | 102 | 98 | 98 | 114 |
|  | Dry grip performance index |  | 100 | 102 | 103 | 100 | 102 | 100 | 105 |

In Comparative Example 1, silica that was not finely-divided silica according to the present invention, and a coupling agent free from a mercapto group were used. Accordingly, the breaking energy and abrasion resistance of Comparative Example 1 were inferior to those of Examples. In Comparative Example 2, finely-divided silica was used, but a mercapto group-containing coupling agent was not used. Accordingly, in Comparative Example 2, the silica was poorly dispersed, the breaking energy was lower than that of Examples, and the abrasion resistance was equal to or lower than that of Examples. In addition, the wet grip performance of Comparative Example 2 was inferior to that of Examples. In Comparative Example 3, finely-divided silica was used, and a mercapto group-containing coupling agent was not used. Accordingly, in Comparative Example 3, the silica was very poorly dispersed, and the breaking energy, abrasion resistance, and wet grip performance were considerably inferior.

In Comparative Example 4, common silica, which was not finely-divided silica, and a mercapto group-containing coupling agent were used. Accordingly, the scorch time was short. Since finely-divided silica was not used in Comparative Example 4, the breaking energy and abrasion resistance were inferior to those of Examples. In Comparative Example 5, common silica, which was not finely-divided silica, and a mercapto group-containing coupling agent different from that used in Comparative Example 4 were used. Accordingly, the scorch time was very short and processing was difficult by usual methods. In addition, the breaking energy, abrasion resistance, and wet grip performance of Comparative Example 5 were inferior.

In Examples, on the other hand, the abrasion resistance and breaking energy indices were good, and breaking energy and abrasion resistance were particularly good in Examples 1 and 2, and in particular, breaking energy was very good in Example 1. In addition, in Examples 1 and 2 in which the total amount of an alkaline fatty acid metal salt, a mixture of a zinc salt of an aliphatic carboxylic acid and a zinc salt of an aromatic carboxylic acid, a zinc salt of a $C_{4-16}$ aliphatic carboxylic acid, and a fatty acid such as stearic acid was in a favorable range, and finely-divided silica excellent in dispersibility was used, especially in Example 1 having the total amount in a particularly favorable range, the rolling resistance indices were good.

The silica dispersibility was good or comparatively good in Examples, and particularly good in Examples 2 and 3 with use of an anti-reversion agent and finely-divided silica excellent in dispersibility. The wet grip performance and dry grip performance of Examples were all good, and equal to or higher than those of Comparative Example 1. Abrasion resistance was good in Examples 6 and 7 in which BR was blended. In Example 7 with use of epoxidized natural rubber 2 with a high epoxidation degree and BR2 with excellent mechanical strength and abrasion resistance, wet grip performance was greatly improved while breaking strength and abrasion resistance were maintained. The results of Example 1 were compared with those of Comparative Example 1 (with use of common silica and a common silane coupling agent), Comparative Example 2 (with use of finely-divided silica and a common silane coupling agent), and Comparative Example 4 (with use of common silica and a mercapto group-containing silane coupling agent). In this comparison, in Example 1, breaking energy, abrasion resistance, rolling resistance, and wet grip performance were synergistically improved, and good dry grip performance was achieved.

strength, and flex crack growth resistance were considerably inferior, and the results of constant stretching fatigue test and rolling resistance were also inferior to those of Examples.

In Comparative Example 11, common silica and a mercapto group-containing coupling agent were used, and therefore the scorch time was short. In addition, since finely-divided silica was not used in Comparative Example 11, the breaking energy, tear strength, and flex crack growth resistance were inferior to those of Examples. Moreover, the result of constant stretching fatigue test of Comparative Example 11 was bad, and durability and crack resistance could be insufficient if the rubber composition was used for a sidewall or a base tread. In Comparative Example 12, common silica and a mercapto group-containing coupling agent different from that used in Comparative Example 11 were used. Accordingly, the scorch time was very short and processing was difficult by usual methods. In addition, the breaking energy,

TABLE 2

Rubber composition for a sidewall and a base tread

| | | | Examples | | | | | Comparative Examples | | | | |
|---|---|---|---|---|---|---|---|---|---|---|---|---|
| | | | 8 | 9 | 10 | 11 | 12 | 8 | 9 | 10 | 11 | 12 |
| Formulation (part(s) by mass) | Process 1 | NR | 60 | 60 | 60 | 60 | 60 | 60 | 60 | 60 | 60 | 60 |
| | | Silica 1 | — | — | — | — | — | 35 | — | — | 35 | 35 |
| | | Silica 2 | — | — | — | 30 | — | — | — | 30 | — | — |
| | | Silica 3 | 30 | 30 | 30 | — | 30 | — | 30 | — | — | — |
| | | Silane coupling agent 1 | — | — | — | — | — | 3 | 2.6 | 2.6 | — | — |
| | | Silane coupling agent 2 | 1.2 | 1.2 | 1.2 | 1.2 | — | — | — | — | 1.5 | — |
| | | Silane coupling agent 3 | — | — | — | — | 0.9 | — | — | — | — | 1.1 |
| | | Stearic acid | 2.5 | — | 2.5 | — | 2.5 | 2.5 | 2.5 | 2.5 | 2.5 | 2.5 |
| | | Anti-reversion agent | — | 2 | 2 | 2 | 2 | — | — | — | — | — |
| | | Zinc oxide | 3 | 3 | 3 | 3 | 3 | 3 | 3 | 3 | 3 | 3 |
| | | Age resistor | 2.0 | 2.0 | 2.0 | 2.0 | 2.0 | 2.0 | 2.0 | 2.0 | 2.0 | 2.0 |
| | | Wax 2 | 1.2 | 1.2 | 1.2 | 1.2 | 1.2 | 1.2 | 1.2 | 1.2 | 1.2 | 1.2 |
| | Process 2 | Epoxidized natural rubber 1 | 40 | 40 | 40 | 40 | 40 | 40 | 40 | 40 | 40 | 40 |
| | | Alkaline fatty acid metal salt | 2 | 2 | 2 | 2 | 2 | 2 | 2 | 2 | 2 | 2 |
| | Process 3 | Sulfur | 1.6 | 1.6 | 1.6 | 1.6 | 1.6 | 1.6 | 1.6 | 1.6 | 1.6 | 1.6 |
| | | Vulcanization accelerator TBBS | 1 | 1 | 1 | 1 | 1 | 1 | 1 | 1 | 1 | 1 |
| Evaluation | | Rolling resistance index | 93 | 100 | 104 | 101 | 102 | 100 | 102 | 106 | 97 | 97 |
| | | Breaking energy index | 128 | 125 | 123 | 111 | 118 | 100 | 110 | 96 | 104 | 99 |
| | | Tear strength index | 130 | 127 | 124 | 116 | 120 | 100 | 115 | 94 | 107 | 97 |
| | | Silica dispersion index | 100 | 103 | 102 | 97 | 100 | 100 | 88 | 83 | 104 | 103 |
| | | Mooney scorch time index | 89 | 123 | 125 | 103 | 80 | 100 | 100 | 101 | 69 | 32 |
| | | Flex crack growth (De Mattia) index (70%) | 117 | 115 | 113 | 108 | 110 | 100 | 105 | 96 | 101 | 96 |
| | | Flex crack growth (De Mattia) index (110%) | 115 | 114 | 114 | 106 | 106 | 100 | 103 | 94 | 101 | 96 |
| | | Constant stretching fatigue test | A | A | A | A | A | C | B | B | C | C |

In Comparative Example 8, silica that was not finely-divided silica according to the present invention, and a coupling agent free from a mercapto group were used. Accordingly, the breaking energy, tear strength, and flex crack growth resistance of Comparative Example 8 were inferior to those of Examples. In addition, in Comparative Example 8, the result of constant stretching fatigue test was bad, and durability and crack resistance could be insufficient if the rubber composition was used for a sidewall or a base tread. In Comparative Example 9, finely-divided silica was used, but a mercapto group-containing coupling agent was not used. Accordingly, in Comparative Example 9, the silica was poorly dispersed, and the breaking energy and tear strength were inferior to those of Examples. In addition, the flex crack growth resistance and the result of constant stretching fatigue test of Comparative Example 9 were inferior to those of Examples. Also in Comparative Example 10, finely-divided silica was used, but a mercapto-group containing coupling agent was not used. Accordingly, in Comparative Example 10, the silica was very poorly dispersed and the breaking energy, tear strength, flex crack growth resistance, and the result of constant stretching fatigue test of Comparative Example 12 were inferior.

In contrast, in Examples, the breaking energy indices and tear strength indices were good. Breaking energy and tear strength were good particularly in Examples 8 and 9, and very good especially in Example 8. In addition, in Examples 8 and 9 in which the total amount of an alkaline fatty acid metal salt, a mixture of a zinc salt of an aliphatic carboxylic acid and a zinc salt of an aromatic carboxylic acid, a zinc salt of a $C_{4-16}$ aliphatic carboxylic acid, and a fatty acid was in a particularly favorable range, and finely-divided silica excellent in dispersibility was used, the rolling resistance indices were good. The silica dispersibility was good or comparatively good in Examples, and particularly good in Examples 9 and 10 with use of an anti-reversion agent and finely-divided silica excellent in dispersibility. In addition, the flex crack growth resistance and the results of constant stretching fatigue test of Examples were all good and better than those of Comparative Example 8.

The results of Example 8 were compared with those of Comparative Example 8 (with use of common silica and a common silane coupling agent), Comparative Example 9 (with use of finely-divided silica and a common silane coupling agent), and Comparative Example 11 (with use of common silica and a mercapto group-containing silane coupling agent). This comparison revealed that in Example 8, breaking energy, tear strength, rolling resistance, flex crack growth resistance, and the result of constant stretching fatigue test were synergistically improved.

The invention claimed is:

1. A tire rubber composition, comprising:
a rubber component that contains an epoxidized natural rubber;
silica; and
a silane coupling agent,
wherein the amount of the epoxidized natural rubber in 100% by mass of the rubber component is 40% by mass or more,
the silica has a CTAB specific surface area of 195 m²/g to 600 m²/g and a BET specific surface area of 200 m²/g to 600 m²/g, and
the silane coupling agent contains a mercapto group;
wherein the amount of the silica is 30 to 75 parts by mass per 100 parts by mass of the rubber component, and
the amount of the silane coupling agent containing the mercapto group is 0.5 to 20 parts by mass per 100 parts by mass of the silica.

2. The tire rubber composition according to claim 1, wherein the silica has an aggregate size of 30 nm or more.

3. The tire rubber composition according to claim 1, wherein the silane coupling agent is a copolymer comprising units A represented by formula (1) and units B represented by formula (2), and the proportion of the units B is 1 to 70 mol % of the total molar amount of the units A and the units B:

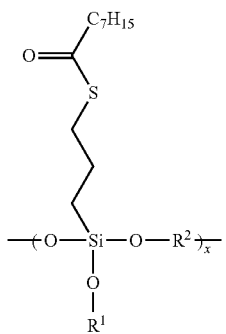

(1)

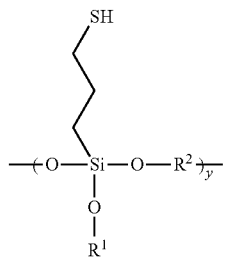

(2)

wherein x and y each are an integer of one or more,
R¹ represents hydrogen, halogen, a branched or unbranched $C_{1-30}$ alkyl or alkylene group, a branched or unbranched $C_{2-30}$ alkenyl or alkenylene group, a branched or unbranched $C_{2-30}$ alkynyl or alkynylene group, or a group in which a hydrogen atom at the end of the alkyl or alkenyl group is replaced with a hydroxy or carboxyl group,
R² represents hydrogen, a branched or unbranched $C_{1-30}$ alkylene or alkyl group, a branched or unbranched $C_{2-30}$ alkenylene or alkenyl group, or a branched or unbranched $C_{2-30}$ alkynylene or alkynyl group, and
R¹ and R² may form a ring structure together.

4. The tire rubber composition according to claim 1, wherein the epoxidation degree of the epoxidized natural rubber 3 to 80 mol %.

5. The tire rubber composition according to claim 1, wherein the CTAB specific surface area is 195 to 300 m²/g and the BET specific surface area is 200 to 300 m²/g.

6. The tire rubber composition according to claim 1, wherein the aggregated size of the silica is 45 nm or more.

7. The tire rubber composition according to claim 1, which further contains a mixture of a zinc salt of an aliphatic carboxylic acid and a zinc salt of an aromatic carboxylic acid, and/or a zinc salt of a $C_{4-16}$ aliphatic carboxylic acid,
wherein the total amount of the mixture and the zinc salt of a $C_{4-16}$ aliphatic carboxylic acid is 0.2 to 10 parts by mass, per 100 parts by mass of the rubber component.

8. The tire rubber composition according to claim 1, which further contains an alkaline fatty acid metal salt,
wherein the amount of the alkaline fatty acid metal salt is 1 to 10 parts by mass, per 100 parts by mass of the epoxidized natural rubber.

9. A sidewall formed from the tire rubber composition according to claim 1.

10. A pneumatic tire formed from the rubber composition according to claim 1.

11. A pneumatic tire having a tread formed from the tire rubber composition according to claim 1, wherein the amount of the epoxidized natural rubber in 100% by mass of the rubber component is 85% by mass or more.

12. A pneumatic tire having a sidewall or base tread formed from the tire rubber composition according to claim 1, wherein the amount of the epoxidized natural rubber in 100% by mass of the rubber component is 40 to 60% by mass, and the amount of a natural rubber in 100% by mass of the rubber component is 40% to 60% by mass.

* * * * *